United States Patent [19]

Schivley, Jr. et al.

[11] 4,275,793
[45] Jun. 30, 1981

[54] AUTOMATIC CONTROL SYSTEM FOR ROCK DRILLS

[75] Inventors: George P. Schivley, Jr., Bridgeport, W. Va.; Peter L. Madonna, Dover, N.J.

[73] Assignee: Ingersoll-Rand Company, Woodcliff Lake, N.J.

[21] Appl. No.: 768,096

[22] Filed: Feb. 14, 1977

[51] Int. Cl.³ .................. B23Q 5/033; E21C 5/10; F15B 11/15; F15B 13/042
[52] U.S. Cl. .......................................... 173/9; 91/318; 91/356; 91/433; 137/486; 137/487.5; 173/19
[58] Field of Search ................. 91/356, 433, 464, 318; 173/9, 4, 19; 137/486, 487.5, 119

[56] References Cited

U.S. PATENT DOCUMENTS

| | | | |
|---|---|---|---|
| 2,735,405 | 2/1956 | Hipple | 91/356 X |
| 2,790,340 | 4/1957 | Cross | 91/356 X |
| 2,987,886 | 6/1961 | Deering et al. | 91/318 |
| 3,727,520 | 4/1973 | McKown et al. | 91/433 |
| 3,732,887 | 5/1973 | Hayner | 91/433 X |
| 3,865,014 | 2/1975 | Van der Kolk | 91/433 X |
| 3,875,746 | 4/1975 | Elliott | 60/369 |
| 3,948,146 | 4/1976 | Maurer et al. | 91/464 X |
| 4,031,813 | 6/1977 | Walters et al. | 91/433 |

Primary Examiner—Irwin C. Cohen
Attorney, Agent, or Firm—R. J. Falkowski

[57] ABSTRACT

A rock drill feed system moves a drill toward and away from a wall with a reciprocating hydraulic motor powered by pressurized fluid. The pressurized fluid is controlled by a movable control valve that has a first position obtained manually to move the drill inwardly to drill, a second position obtained automatically when the drill has completed drilling, and a third position obtained automatically when the drill has been completely withdrawn. The sensing of the location of the drill to position the control valve is accomplished by measuring the pressure and flow rate of the hydraulic fluid delivered to the motor with pressure responsive switches. When the pressure exceeds a preselected level and the flow rate drops below a preselected level, the two pressure switches close to produce a signal that moves the valve to another position.

10 Claims, 3 Drawing Figures

AUTOMATIC CONTROL SYSTEM FOR ROCK DRILLS

This invention relates to rock drilling systems, particularly rock drilling systems that automatically feed and retract rock drills during drilling operations.

Automatic feeding, retracting and stopping of rock drills is known in the art. Typically, either pneumatic or hydraulic control circuits including control valves drive a fluid motor connected to move a drill in drilling and retracting directions. The determination of the position of this drill is usually done by devices physically contacted by the drill as it moves. The sensors are typically limit switches but other types, such as photoelectric sensors or mechanical trips, are also used.

These systems work with varying success but often encounter difficulty because of dust and other debris that interfere with reliable operation of the sensing mechanisms. Other adverse conditions such as vibration, shock, and destruction caused by falling rock also make prior art devices troublesome in operation.

With this invention, an automatic control system for a rock drilling system connects a driving motor to the drill and senses the position of the drill solely by the fluid flow conditions in the powering system. This enables the entire sensing of the position of the drill to be accomplished remotely from the adverse conditions that are present at the drill site.

The objects and the advantages of the invention will be apparent from the following detailed description.

Figure 1:
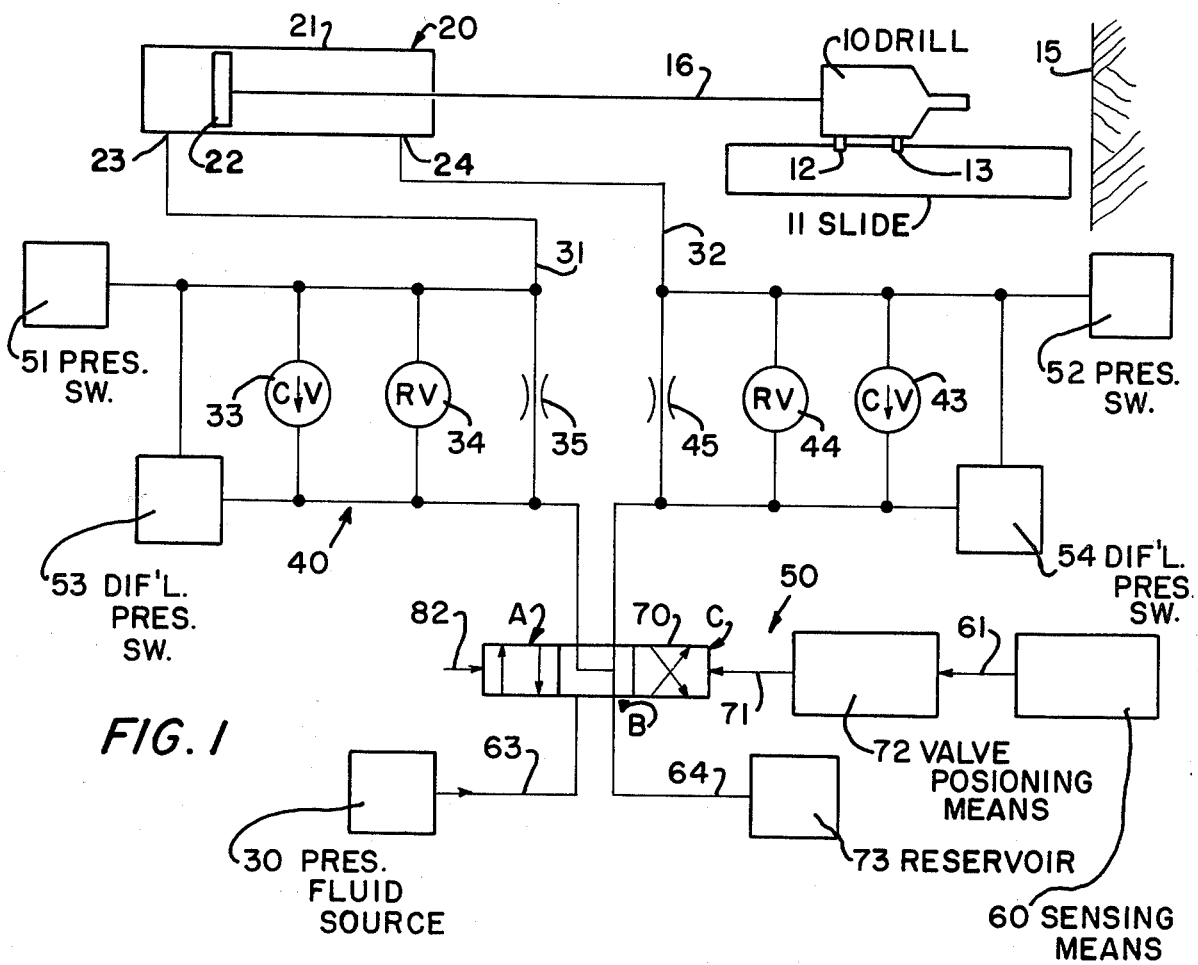
FIG. 1 is a simplified schematic drawing of a fluid system controlling a drill in accordance with this invention.

Referring to FIG. 1, a drill feed system controls a rock drill 10 mounted on a slide 11 by slide blocks 12 and 13 and moved toward and away from a wall 15 in any manner known in the art by any suitable driving means for reciprocally moving the drill. The driving means comprises a fluid motor 20 of a reciprocating piston or other suitable type mechanically connected in any manner known, as shown schematically by line 16, to move drill 10 inwardly and outwardly. Fluid motor 20 has a casing 21, a fluid piston 22, and a first port 23 and a second port 24 connected to receive pressurized fluid on either side of the piston.

A pressurized fluid source 30 of any type known in the art is connected to motor 20 through a connecting means 40 for delivering fluid from source 30 to motor 20.

A control means 50 for controlling fluid flow direction connects the pressurized fluid source through the connecting means to the fluid motor.

The connecting means comprises a conduit 31 and a conduit 32 connected to ports 23 and 24, respectively, of fluid motor 20, a selected restriction or orifice 35 in conduit 31, a check valve 33 and a relief valve 34 connected in parallel with restriction 35, a restriction or orifice 45 in conduit 32, and a check valve 43 and a relief valve 44 connected in parallel with restriction 45.

Figure 2:
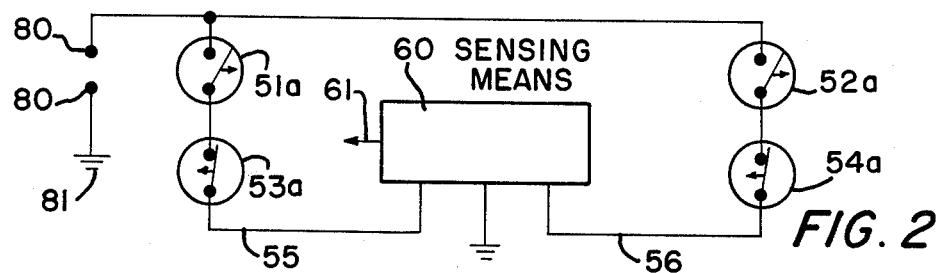
FIG. 2 is a schematic view of the electrical system for the fluid system shown in FIG. 1.

Referring to FIGS. 1 and 2, the control means comprises a pressure means for measuring the pressure of the fluid delivered to motor 20 having a pressure sensor or switch 51 having contacts 51a connected to conduit 31 and port 23, and a pressure sensor or switch 52 having contacts 52a connected to conduit 32 and port 24. Pressure switch contacts 51a and 52a are connected to produce a signal by closing to indicate the pressure of the fluid delivered to motor 20.

The control means also comprise a pressure differential means for measuring the fluid flow from fluid source 30 to motor 20. The differential pressure means includes a differential pressure sensor or switch 53 having contacts 53a connected across restriction 35 in conduit 31, and a differential pressure sensor or switch 54 having contacts 54a connected across restriction 45 in conduit 32. The differential pressure switches are connected to produce a signal by closing to indicate the pressure drop across the respective restrictions and thereby indicate the fluid flow rate.

The control means also comprises a sensing means 60, of any type known in the art, that receives appropriate signals for producing a control signal, as shown schematically by line 61, in response to appropriate input signals, and a flow means for controlling fluid flow to motor 20 in response to the control signal from sensing means 60.

The flow means comprises a movable control valve 70 and a means 72 for positioning the control valve as shown schematically by line 71, in response to the control signal, in any manner known in the art, to assume any one of several positions. A conduit 63 connects control valve 70 to source 30, and a conduit 64 connects the control valve to a reservoir or tank 73.

Referring to FIG. 2, the signal system for the control means comprises an electrical circuit having normally open electrical contacts 51a of pressure switch 51, normally closed electrical contacts 53a of differential pressure switch 53 normally open electrical contacts 52a of pressure switch 52, and normally closed contacts 54a of pressure switch 54. A suitable electrical power source 80 is connected between a ground 81 and the sensing means through the switch contacts to provide power for the sensing means and associated circuitry.

In operation of the system, to move drill 10 in a drilling condition, a means for manually moving movable valve 70 is provided in any manner known in the art as schematically shown by arrow 82, and is used to move valve 70 to a first of three positions. In its first position, shown schematically as section "A" in valve 70, the pressure fluid source is connected through section "A" to conduit 31 and fluid is supplied from source 30 through conduit 31 to port 23 of motor 20. At the same time, reservoir 73 is connected through conduit 64 and movable valve 70 to conduit 32 and port 24. The pressurized fluid at port 23 moves piston 22 to the right, as shown in the drawing, and mechanical linkage 16 moves drill 10 along slide 11 to commence drilling into wall 15. The fluid returning through conduit 32 flows through check valve 43 so that the resistance of restriction 45 is not in the return path.

At the start of the operation, when piston 22 moves relatively easily to the right, the pressure at port 23 is below the selected operating level of pressure switch 51 and pressure switch contacts 51a are open. Therefore, no signal is delivered to sensing means 60.

As piston 22 moves to the right and drill 10 reaches the end of its run, or fluid piston 22 reaches the end of its selected travel path, the drill and piston 22 stop or slow down significantly as the opposing force increases. This increases the pressure of the fluid in conduit 31 and port 23. When this pressure increases above a selected level pressure switch 51 operates to close its normally open contacts 51a.

Also, as the drilling operation starts and the flow rate is low, the pressure drop across restriction 35 is low and the differential pressure switch contacts 53a, which are normally closed, remain in a closed condition until the flow rate increases to some preselected level at which time the contacts open. The operating flow rate and operating pressure relationship is selected so that during anticipated normal operation the differential pressure switch will open before the pressure switch closes. The operating conditions of the switches are selected to insure proper operation and to provide protection against unexpected forces stopping drill 10.

At the end of the normal drilling cycle, pressure switch contacts 51a close because of the increased pressure, and the normally closed contacts 53a of switch 53 also close because of the reduced pressure drop across restriction 35. The closing of the switches completes a circuit from source 80 to sensing means 60 through contacts 51a and 53a to provide a signal.

Sensing means 60 may be any type of electrical circuit such as a flip-flop circuit, that upon receiving a signal in one of its inputs, as through contacts 51a and 53a along a conductor 55 or through contacts 52a and 54a along a conductor 56, produces an output to a valve positioning means of any known type. The valve positioning means in any manner known in the art moves valve 70 from its first position having section "A" in line with the conduits to a second position having a second section "C" connected to the conduits with the fluid source connected to motor 20 through conduit 32 and port 24 and reservoir 73 connected through conduit 64 to port 23 and conduit 31. This reverses the pressure relationship on piston 22 to reverse the direction of fluid motor movement and the drill is withdrawn from the drill hole and moves, to the left as shown in the drawing, along its slide. The situation is similar to the drilling operation and the fluid flowing back through conduit 31 passes through check valve 33 and returns to reservoir 73. The pressurized fluid is delivered through conduit 32 and restriction 45 and this is sensed in the same manner as by switches 51 and 53 by pressure switches 52 and pressure differential switch 54.

When a normal or other stopping condition occurs, the pressure rises and the flow decreased producing a signal to sensing means 60 as contacts 52a and 54a close. Sensing means 60 receives this signal, delivers a signal to the valve positioning means which moves valve 70 from having its "C" section connected to the conduits to having a "B" section connected to the conduits, as shown in the drawing. This position of the valve connects both conduits 31 and 32 to the reservoir and no pressurized fluid is delivered to motor 20, and piston 22 and motor 20 remain in position until valve 70 is again moved.

Figure 3:
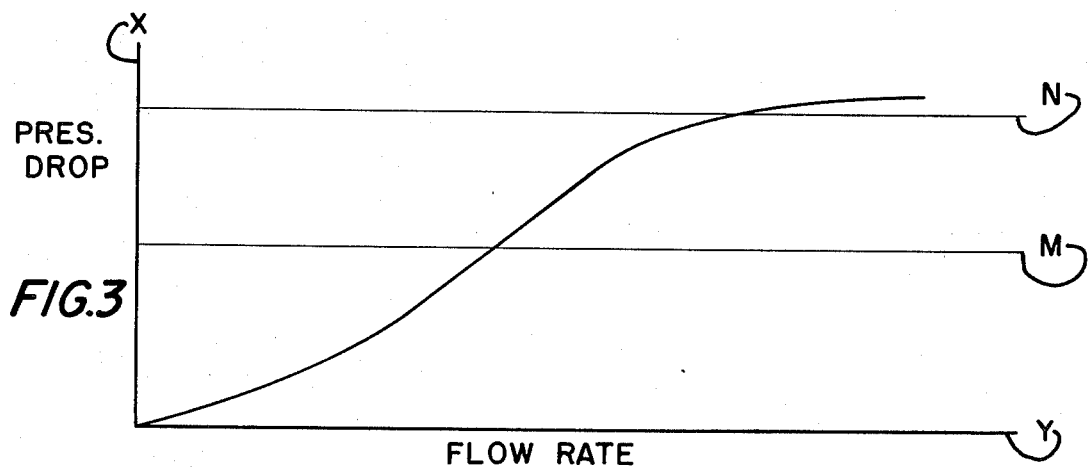
FIG. 3 is a curve of the pressure drop to fluid flow relationship in the system shown in FIG. 1.

The relationship of the operation of pressure switches 51 and 52 and differential pressure switches 53 and 54 is critical to the operation of the system and is adjustable in accordance with the drilling conditions expected to be encountered. Thus, referring to FIG. 3, where pressure drop is shown along the "x" axis and the fluid flow rate along the "y" axis, the curve shows the increased pressure drop across either of the orifices 35 or 45 as the flow rate increases. Line "M" in FIG. 3 shows a typical selected differential pressure switch operation level where the differential pressure switch would be adjusted to open as the pressure drop rises above the indicated level at line "M" and close when below line "M". Pressure switch 51 and 52 would be selected typically to operate at some level insuring that damage would not be done to the drill and its connecting mechanism and would reverse the operation of the drill or turn it off when any preselected stopping conditions occur.

Line "N" in FIG. 3 shows a typical setting for relief valve 34 and 44 which limit the pressure in the system across restrictions 35 and 45 by opening at a pressure above line "N".

We claim:

1. A control means for use in a drill feed system of the type having a driving means connected to receive pressurized fluid to move a drill, a pressurized fluid source, and a connecting means for delivering pressurized fluid from the fluid source to the driving means; said control means comprising:
   a pressure means for measuring the pressure of the fluid delivered to the driving means to produce a signal indicating fluid pressure level;
   a pressure differential means for measuring the flow of the fluid delivered to the driving means to produce a signal indicating fluid flow rate:
   a sensing means responsive to the signals of the pressure means and pressure differential means for producing a signal indicating a preselected fluid pressure level and a preselected flow rate; and
   a flow means for controlling the direction of fluid flow to the driving means in response to the signal of the sensing means.

2. A control means according to claim 1 wherein said pressure differential means comprises a means for measuring the fluid pressure drop across a selected portion of the connecting means to determine fluid flow rate.

3. A drill system for automatically moving a rock drill to and from a surface to be drilled comprising:
   a pressurized fluid source,
   a driving means connected to receive pressurized fluid for moving a drill in response to the pressure and flow of the fluid;
   a connecting means for delivering the pressurized fluid from the fluid source to the driving means,
   a pressure means for measuring the pressure of the fluid delivered to the driving means to produce a signal indicating the fluid pressure level;
   a pressure differential means for measuring the fluid flow delivered to the driving means to produce a signal indicating the fluid flow rate;
   a sensing means responsive to the signals of the pressure means and pressure differential means for producing a signal indicating a preselected fluid pressure level and a preselected fluid flow rate; and
   a flow means for controlling the fluid flow to the driving means in response to a selected signal of the sensing means to thereby control the moving of a drill.

4. A feed system according to claim 3 wherein:
   said connecting means comprises a conduit connected to deliver fluid to the driving means to move a drill in a selected direction,
   said pressure means comprises a first pressure sensor connected to produce a pressure signal when the pressure of the fluid delivered to the driving means by the conduit is above a preselected level; and
   said pressure differential means comprises a pressure differential system connected to produce a flow signal when fluid flow in the conduit is below a preselected level;

said sensing means is responsive to the pressure signal and the flow signal to produce a control signal; and said flow means comprises a movable control valve connected to the connecting means between the fluid source and the driving means to control fluid flow, and a positioning means for moving the valve in response to the control signal.

5. A feed system according to claim 4 wherein said pressure differential system comprises a pressure differential switch connected across a selected portion of the connecting means to produce a signal when the pressure drop across said selected portion is below a preselected level.

6. A feed system according to claim 3 wherein:

said connecting means comprises a first conduit connected to deliver fluid to the driving means to move the drill in one direction and a second conduit connected to deliver fluid to the driving means to move the drill in another direction;

said pressure means comprises a first pressure sensor connected to produce a first pressure signal when the pressure of the fluid delivered to the driving means by the first conduit is above a preselected level, and a second pressure sensor connected to produce a second pressure signal when the pressure of the fluid delivered to the driving means by the second conduit is above a preselected level;

said pressure differential means comprises a first pressure differential system connected to produce a first flow signal when the fluid flow in the first conduit is below a preselected level, and a second pressure differential system connected to produce a second flow signal when the fluid flow in the second conduit is below a preselected level;

said sensing means is responsive to the first pressure signal and the first flow signal to produce a first control signal and is responsive to the second pressure signal and the second flow signal to produce a second control signal; and said flow means comprises a movable control valve connected to the connecting means having a first position connecting the fluid source to the first conduit and a second position connecting the fluid source to the second conduit, and a positioning means for moving the valve position in response to the first and second control signal.

7. A feed system according to claim 3 wherein:

said connecting means comprises a first conduit connected to deliver fluid to the driving means to move a drill in one direction and a second conduit connected to deliver fluid to the driving means to move a drill in another direction; and said control means comprises a movable control valve connected between the fluid source and the first and second conduits having one position connecting the fluid source to the first conduit and another position connecting the fluid source to the second conduit; and a positioning means responsive to the fluid pressure and the fluid flow for moving the valve to the other position when the fluid pressure is above a preselected level, and the fluid flow rate is below a preselected level in the first conduit, and the valve is in the one position, and responsive to the fluid pressure and the fluid flow for moving the valve from the other position when the fluid pressure is above a preselected level, the fluid flow is below a preselected level in the second conduit, and the valve is in the other position.

8. A feed system according to claim 3 wherein:

said connecting means comprises a first conduit connected to deliver fluid to the driving means to move a drill in one direction and a second conduit connected to deliver fluid to the driving means to move a drill in another direction; and said control means comprises a movable control valve connected between the fluid source and the first and second conduits having a first position connecting the fluid source to the first conduit, a second position disconnecting the fluid source from the first and second conduit, and a third position connecting the fluid source to the second conduit; and a positioning means for moving the control valve to the third position in response to a fluid pressure above a preselected level and a fluid flow below a preselected level in the first conduit and responsive to the fluid pressure and the fluid flow for moving the control valve from the third position to the second position in response to a fluid pressure above a preselected level and a fluid flow below a preselected level in the second conduit.

9. A feed system according to claim 3 wherein said connecting means comprises conduits connected to deliver pressurized fluid from the fluid source to the driving means with selected conduits having selected restrictions between the fluid source and the driving means; and said control means comprises:

a pressure means for measuring the pressure of the fluid delivered to the driving means to produce a signal when the pressure is above a preselected level;

a pressure differential means for measuring the pressure drop of the fluid flowing through a selected restriction to produce a signal when the pressure drop is below a preselected level; and a flow means for controlling fluid flow in the conduits to change the direction of fluid flow in response to the occurrence of the pressure differential means signal and the pressure means signal to thereby control movement of a rock drill.

10. A rock drilling system comprising:

a rock drill;

a fluid motor having a fluid port connected to move the rock drill to and from a wall to be drilled by receiving pressurized fluid through a port;

a conduit having a selected restriction connected to said port;

a pressurized fluid source;

a control valve connected between the fluid source and the conduit, said control valve having one position connecting the fluid source to the conduit and another position disconnecting the fluid source from the conduit;

a means for moving the control valve to the one position to start the operation of a rock drill by supplying pressurized fluid to the conduit;

a pressure switch connected to sense the pressure at the port and having a first condition when the pressure is above a preselected level and a second condition when the pressure is below a preselected level;

a pressure differential switch connected to sense the pressure drop across the restriction in the conduit having a first condition when the pressure drop is below a preselected level and a second when the pressure drop is above a preselected level; and a positioning means for moving the control valve from the one position to the other position in response to the first conditions of the pressure switch and the pressure differential switch.

* * * * *

UNITED STATES PATENT AND TRADEMARK OFFICE
CERTIFICATE OF CORRECTION

PATENT NO. : 4,275,793
DATED : June 30, 1981
INVENTOR(S) : George P. Schivley, Jr., Peter L. Madonna It is certified that error appears in the above-identified patent and that said Letters Patent are hereby corrected as shown below:

In claim 3, line 1:

After "drill" insert -feed-.

Signed and Sealed this

Twentieth Day of October 1981

[SEAL]

Attest:

GERALD J. MOSSINGHOFF

Attesting Officer

Commissioner of Patents and Trademarks